United States Patent
Taguchi et al.

(10) Patent No.: US 10,859,745 B2
(45) Date of Patent: Dec. 8, 2020

(54) VEHICLE MIRROR

(71) Applicant: FUJIFILM Corporation, Tokyo (JP)

(72) Inventors: Takao Taguchi, Minamiashigara (JP); Kazuhiro Oki, Minamiashigara (JP); Mitsuyoshi Ichihashi, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 15/933,590

(22) Filed: Mar. 23, 2018

(65) Prior Publication Data

US 2018/0210124 A1 Jul. 26, 2018

Related U.S. Application Data

(63) Continuation of application No. PCT/JP2016/075664, filed on Sep. 1, 2016.

(30) Foreign Application Priority Data

Sep. 30, 2015 (JP) .................... 2015-193070

(51) Int. Cl.
*G02B 5/30* (2006.01)
*B32B 7/02* (2019.01)
(Continued)

(52) U.S. Cl.
CPC .............. *G02B 5/3083* (2013.01); *B32B 7/02* (2013.01); *B32B 17/10743* (2013.01);
(Continued)

(58) Field of Classification Search
CPC .. G02B 5/0808; G02B 5/8025; G02B 5/3083; B60R 1/04; B60R 1/088
(Continued)

(56) References Cited

U.S. PATENT DOCUMENTS 4,105,821 A * 8/1978 Blaich ................. C23C 14/0021
427/255.28
4,805,989 A * 2/1989 Nakajima ............... B60R 1/083
359/359
(Continued)

FOREIGN PATENT DOCUMENTS

CN 201329784 Y 10/2009
CN 102887114 B 4/2015
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2016/075664, dated Apr. 12, 2018, with an English translation of the Written Opinion.
(Continued)

*Primary Examiner* — Ricky D Shafer
(74) *Attorney, Agent, or Firm* — Birch, Stewart, Kolasch & Birch, LLP

(57) ABSTRACT

The vehicle mirror includes a high-Re retardation film and a reflective layer. The high-Re retardation film has a front retardation of 5,000 nm or more, and the reflective layer is a reflective layer that is reflective in an unpolarized manner, such as a reflective metal layer. The vehicle mirror may be a vehicle mirror further including an image display device, wherein the high-Re retardation film, the reflective layer, and the image display device are disposed in this order, and the reflective layer is transflective.

21 Claims, 2 Drawing Sheets

(51) Int. Cl.
  *B60R 1/04* (2006.01)
  *G02B 5/26* (2006.01)
  *G02B 5/28* (2006.01)
  *G02B 5/08* (2006.01)
  *B32B 17/10* (2006.01)
  *B60R 1/08* (2006.01)
  *C08J 5/18* (2006.01)

(52) U.S. Cl.
  CPC ............... *B60R 1/04* (2013.01); *B60R 1/088* (2013.01); *G02B 5/08* (2013.01); *G02B 5/0808* (2013.01); *G02B 5/0825* (2013.01); *G02B 5/26* (2013.01); *G02B 5/28* (2013.01); *G02B 5/30* (2013.01); *B32B 17/10064* (2013.01); *B32B 17/10678* (2013.01); *C08J 5/18* (2013.01)

(58) Field of Classification Search
  USPC .................................. 359/489.07, 833, 883
  See application file for complete search history.

(56) References Cited

U.S. PATENT DOCUMENTS

| | | | | |
|---|---|---|---|---|
| 4,973,132 | A * | 11/1990 | McDonald | G02B 5/3066 359/13 |
| 5,408,357 | A | 4/1995 | Beukema | |
| 6,166,848 | A * | 12/2000 | Cammenga | B60Q 1/2665 359/267 |
| 10,501,017 | B2 * | 12/2019 | Taguchi | B60R 1/04 |
| 2002/0008909 | A1 | 1/2002 | Nishikawa et al. | |
| 2002/0140884 | A1 | 10/2002 | Richard | |
| 2007/0146481 | A1 * | 6/2007 | Chen | B60R 1/12 348/148 |
| 2007/0279756 | A1 * | 12/2007 | Rosario | B60R 1/12 359/633 |
| 2008/0266500 | A1 * | 10/2008 | Nimura | G02F 1/133634 349/117 |
| 2013/0100378 | A1 | 4/2013 | Murata et al. | |
| 2015/0369981 | A1 * | 12/2015 | Takeda | G02B 5/305 359/488.01 |
| 2016/0048057 | A1 * | 2/2016 | Sekiguchi | G02F 1/133528 349/61 |
| 2016/0109632 | A1 * | 4/2016 | Takegami | G02B 5/3033 359/489.07 |
| 2016/0377780 | A1 | 12/2016 | Honda | |
| 2019/0079304 | A1 * | 3/2019 | Ando | G02F 1/133536 |

FOREIGN PATENT DOCUMENTS

| | | |
|---|---|---|
| JP | 2002-154177 A | 5/2002 |
| JP | 2010-230771 A | 10/2010 |
| JP | 2011-527773 A | 11/2011 |
| JP | 2013-257579 A | 12/2013 |
| JP | 2014-201146 A | 10/2014 |
| WO | WO 2010/005853 A1 | 1/2010 |
| WO | WO 2015/056594 A1 | 4/2015 |
| WO | WO 2015/098767 A1 | 7/2015 |

OTHER PUBLICATIONS

International Search Report (Form PCT/ISA/210) for International Application No. PCT/JP2016/075664, dated Nov. 29, 2016, with an English translation.
Japanese Office Action for corresponding Japanese Application No. 2015-193070, dated Mar. 27, 2018, with an English translation.
Extended European Search Report for corresponding European Application No. 16851019.6, dated Sep. 20, 2018.
European Office Action for European Application No. 16851019.6, dated Aug. 5, 2019.
Japanese Office Action, dated Nov. 6, 2018, for corresponding Japanese Application No. 2015-193070, with an English translation.

* cited by examiner

VEHICLE MIRROR

CROSS-REFERENCE TO RELATED APPLICATIONS

This application is a Continuation of PCT International Application No. PCT/JP2016/075664, filed on Sep. 1, 2016, which claims priority under 35 U.S.C. § 119(a) to Japanese Patent Application No. 2015-193070, filed on Sep. 30, 2015. Each of the above application(s) is hereby expressly incorporated by reference, in its entirety, into the present application.

BACKGROUND OF THE INVENTION

1. Field of the Invention

The present invention relates to a vehicle mirror.

2. Description of the Related Art

The properties of mirror-reflected images of vehicle mirrors may affect safety. Thus, various improvements have been made in order, for example, to provide anti-glare characteristics or to achieve wider viewing angles. In recent years, a vehicle mirror capable of displaying, for example, an image picked up by an onboard camera has also been developed (e.g., JP2014-201146A).

SUMMARY OF THE INVENTION

Drivers of vehicles running outdoors may wear polarizing sunglasses, and vehicle mirrors need to provide good mirror-reflected images also when drivers wear polarizing sunglasses. However, the inventors found out that when a mirror-reflected image of an external scene was observed through polarizing sunglasses, there was oblique brightness unevenness of light in the mirror-reflected image. The present invention has been developed in view of this problem and aims to provide a vehicle mirror that allows the observation of a mirror-reflected image in which such brightness unevenness is reduced.

The inventors conducted intensive studies to solve the above-described problem and found that such unevenness in a mirror-reflected image as described above can be observed when an external scene is viewed through a rear window pane of a vehicle. On the basis of this finding, the inventors further conducted studies to complete the present invention.

Thus, the present invention provides [1] to [11] below.
[1] A vehicle mirror including a high-Re retardation film and a reflective layer, wherein the high-Re retardation film has a front retardation of 5,000 nm or more, and the reflective layer is reflective in an unpolarized manner.
[2] The vehicle mirror according to [1], wherein the reflective layer is a reflective metal layer or a dielectric multilayer film.
[3] The vehicle mirror according to [2], wherein the reflective metal layer includes aluminum or silver.
[4] The vehicle mirror according to [2], wherein the reflective metal layer includes aluminum.
[5] The vehicle mirror according to any one of [2] to [4], wherein the reflective metal layer is a vapor-deposited layer.
[6] The vehicle mirror according to any one of [1] to [5], wherein the front retardation is 7,000 nm or more.
[7] The vehicle mirror according to any one of [1] to [6], wherein the high-Re retardation film is a polyester film.
[8] The vehicle mirror according to any one of [1] to [7], wherein the high-Re retardation film includes polyethylene terephthalate.
[9] The vehicle mirror according to any one of [1] to [8], wherein the reflective metal layer includes aluminum, and the high-Re retardation film includes polyethylene terephthalate.
[10] The vehicle mirror according to any one of [1] to [9], further including a front panel, wherein the front panel is a glass laminate including two glass plates and an interlayer between the two glass plates, and the interlayer includes the high-Re retardation film.
[11] The vehicle mirror according to any one of [1] to [10], further including an image display device, wherein the high-Re retardation film, the reflective layer, and the image display device are disposed in this order, and the reflective layer is transflective.

The present invention provides a vehicle mirror that, when observed through polarizing sunglasses, allows the observation of a mirror-reflected image free of unevenness. When the vehicle mirror of the present invention is observed through polarizing sunglasses, an external scene through a rear window pane can be observed as a mirror-reflected image free of unevenness.

DESCRIPTION OF THE PREFERRED EMBODIMENTS

Figure 1:
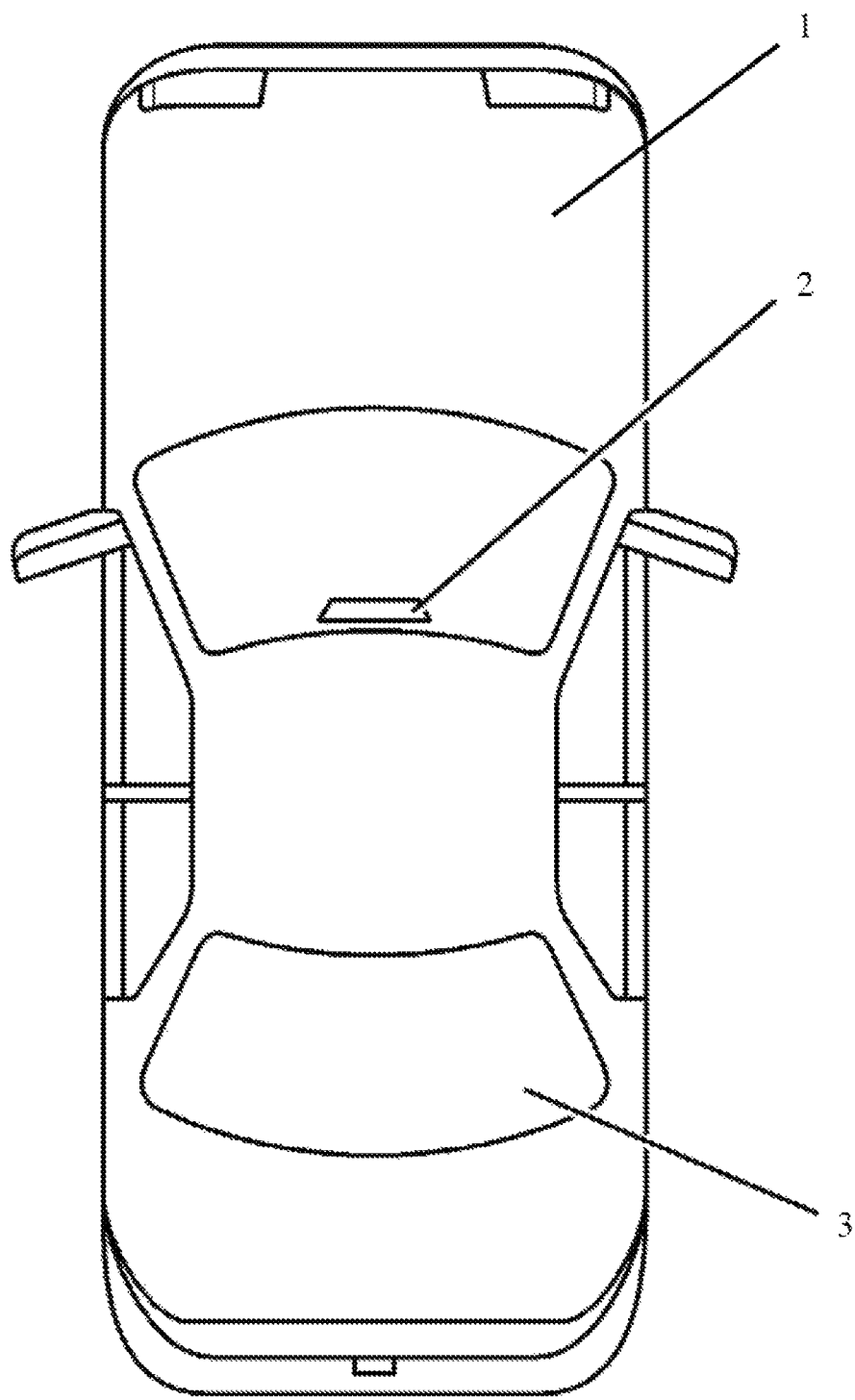
FIG. 1 shows a top view of a vehicle installed with a rear-view mirror.
Figure 2:
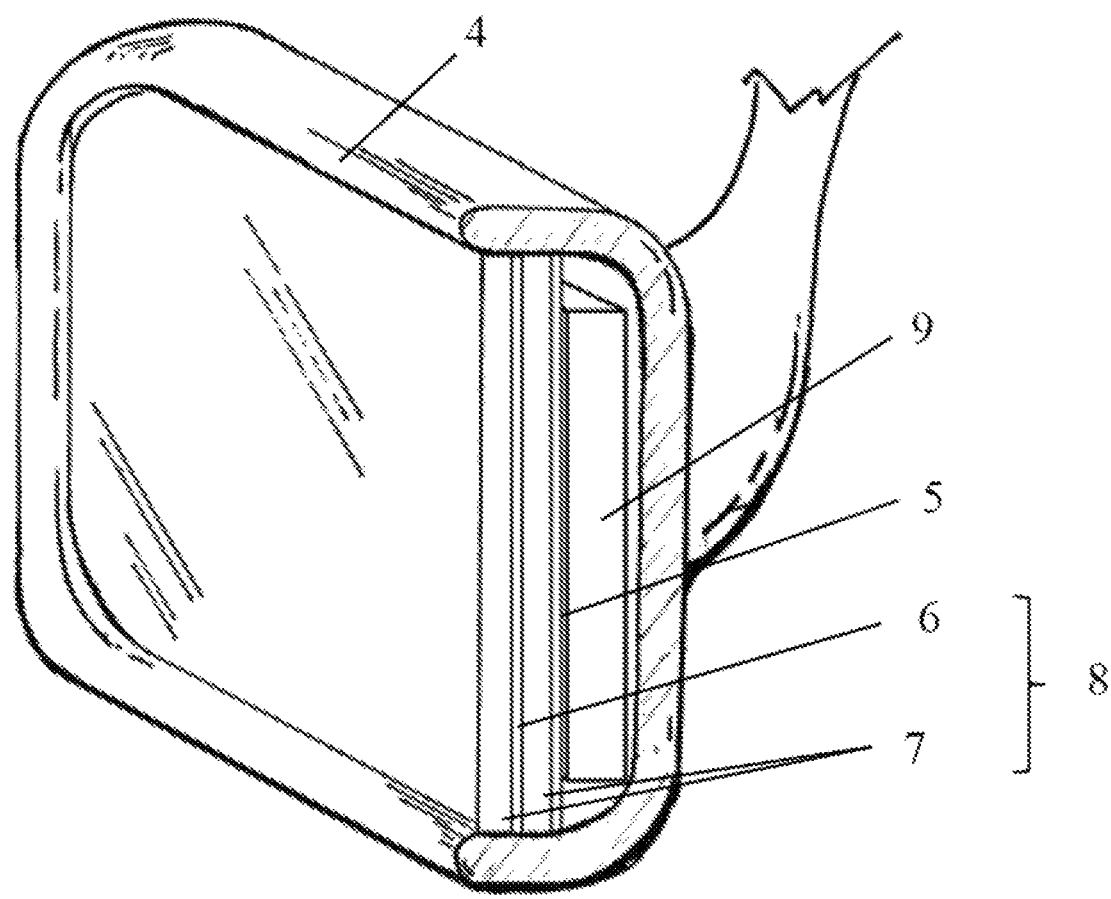
FIG. 2 shows a perspective cross-sectional view of the rear-view mirror.

The present invention will now be described in detail.

In this specification, " . . . to . . . " is meant to include numerical values before and after "to" as a lower limit and an upper limit.

In this specification, an expression related to an angle, such as "45°", "parallel", "perpendicular", or "orthogonal", means that the difference from an exact angle is less than 5 degrees unless otherwise specified. The difference from an exact angle is preferably less than 4 degrees, more preferably less than 3 degrees.

In this specification, "(meth)acrylate" is used to mean "one or both of acrylate and methacrylate".

Visible light is electromagnetic radiation having a wavelength visible to the human eye, i.e., light in a wavelength region of 380 nm to 780 nm. Infrared radiation (infrared light) is electromagnetic radiation with wavelengths longer than those of visible light and shorter than those of radio waves. Among the types of infrared radiation, near-infrared light is electromagnetic radiation in a wavelength region of 780 nm to 2,500 nm.

In this specification, a "mirror-reflected image" means a reflected image observed in a vehicle mirror. An "image" means an image that can be visually observed through an image display unit in a vehicle mirror having an image display device.

In this specification, a vehicle 1 means a train, an automobile, or the like. The vehicle 1 is particularly preferably an automobile having a rear window pane 3.

The vehicle mirror 4 can be used as a rear-view mirror (internal mirror) 2 of a vehicle 1. For use as a rear-view mirror 2, the vehicle mirror 4 may have a support arm or the like for attachment to a frame, a housing, or a vehicle body.

Alternatively, the vehicle mirror 4 may be formed for incorporation into a rear-view mirror 2.

The vehicle mirror is preferably plate-like or film-like and may have a curved surface. The front surface of the vehicle mirror may be flat or curved. When the vehicle mirror is curved and has a convex surface on the front, the vehicle mirror can be a wide-angle mirror that allows a rearward view and the like to be visible at a wide angle.

The curve may be in the vertical direction, the horizontal direction, or the vertical and horizontal directions. The radius of curvature of the curve is preferably 500 to 3,000 mm, more preferably 1,000 to 2,500 mm. The radius of curvature is a radius of an imaginary circumcircle of the curved portion in section.

The vehicle mirror includes a reflective layer and a high-Re retardation film. The reflective layer and the high-Re retardation film are preferably laminated on each other with their major surface areas being the same. In this specification, a "main surface" refers to a surface (a front surface or a rear surface) of a plate-like or film-like member.

The vehicle mirror may include other layers such as an adhesive layer.

The vehicle mirror may be a glass laminate, and the glass laminate may include, as an interlayer, a high-Re retardation film, a reflective layer, or a high-Re retardation film and a reflective layer.

The thickness of the vehicle mirror is not particularly limited but preferably 100 μm to 20 mm, more preferably 200 μm to 15 mm, still more preferably 300 μm to 10 mm.

High-Re Retardation Film

The vehicle mirror of the present invention includes a high-Re retardation film having a front retardation of 5,000 nm or more. In this specification, a "high-Re retardation film" means a retardation film having a high front retardation. The front retardation of the high-Re retardation film is preferably 6,000 nm or more, more preferably 8,000 nm or more. The front retardation of the high-Re retardation film is preferably as high as possible, but in view of production efficiency and thinness, the front retardation may be 100,000 nm or less, 50,000 nm or less, 40,000 nm or less, or 30,000 nm or less.

The high-Re retardation film having such a high front retardation as described above can convert polarized light generated when a window pane (particularly, a rear window pane) of a vehicle transmits sunlight into quasi-unpolarized light.

Front retardations that can convert polarized light into quasi-unpolarized light are described in paragraphs <0022> to <0033> in JP2005-321544A. A specific value of the front retardation can be determined depending on the vehicle including the vehicle mirror of the present invention. In particular, the specific value may be determined depending on the magnitude of a front retardation caused in sunlight transmitted through a rear window pane of the vehicle.

Tempered glass (e.g., tempered glass not having a glass laminate structure) used for window panes, particularly, for rear window panes of vehicles is known to have birefringence distribution. Tempered glass is typically produced by heating float plate glass to 700° C. which is near its softening point and then blowing air to the surface of the glass to rapidly cool the glass. In this process, the surface of the glass is cooled first and contracted to become solid, whereas the interior of the glass is cooled more slowly than the surface and thus slowly contracted. As a result, stress distribution is generated inside, and birefringence distribution is generated in the tempered glass even when float plate glass having no birefringence is used.

Therefore, a mirror-reflected image created by light incident on a vehicle mirror through, for example, a rear window pane including tempered glass produced particularly as described above is considered to have brightness unevenness. That is, polarized components of sunlight are lopsided to either p-polarized light or s-polarized light depending on the position of an observer in relation to the position of the sun. Light reflected by the surface of water or the surface of asphalt, glass, or the like includes s-polarized light in greater proportion. Such polarized light exists in nature, and when light including polarized light is transmitted through a rear window pane, polarization distribution is generated in the transmitted light due to the polarized distribution of birefringence of the rear window pane. Such light is not depolarized when reflected by a vehicle mirror, and thus when the vehicle mirror is observed through polarizing sunglasses that transmit p-polarized light alone, brightness unevenness can be visually observed due to the polarization distribution. Presumably, in the vehicle mirror of the present invention, the high-Re retardation film having a retardation of a predetermined magnitude converts light incident on the vehicle mirror into quasi-unpolarized light before the light is incident on the reflective layer to eliminate polarization distribution, thus enabling a reduction in unevenness.

In this specification, p-polarized light means polarized light that oscillates in a direction parallel to a plane of incidence of light, and s-polarized light means polarized light that oscillates in a direction perpendicular to the plane of incidence of light. The plane of incidence means a plane that is perpendicular to a plane of reflection (e.g., the ground) and includes incidence rays and reflected rays.

The high-Re retardation film may be a birefringent material such as a plastic film or a quartz plate. Examples of plastic films include polyester films such as polyethylene terephthalate (PET), polycarbonate films, polyacetal films, and polyarylate films. For the retardation film including PET and having a high retardation, reference may be made, for example, to JP2013-257579A or JP2015-102636A. Commercially available products such as a Cosmoshine (registered trademark) super retardation film (Toyobo Co., Ltd.) may be used.

A plastic film having a high retardation can be typically formed by melt-extruding a resin, casting the extrudate onto a drum or the like into film form, and uniaxially or biaxially stretching the film at a stretching ratio of 2 to 5 under heating.

After the stretching, a heat treatment called "heat setting" may be performed at a temperature higher than the stretching temperature in order to promote crystallization and increase the strength of the film.

Using the high-Re retardation film in a rear window pane of a vehicle can also eliminate the above-described unevenness in a mirror-reflected image. In this case, the vehicle mirror need not include the high-Re retardation film. The polarization distribution generated may be eliminated by achieving the front retardation of 5,000 nm or more as a total of the front retardation of the retardation film used in the rear window pane of the vehicle and the front retardation of the retardation film in the vehicle mirror.

Reflective Layer

The reflective layer is preferably plate-like or film-like and may have a curved surface. The reflective layer may be flat or curved. Such a curved front surface can be created, for example, by using a curved substrate as a substrate described below.

In the vehicle mirror of the present invention, the reflective layer is reflective in an unpolarized manner. The reflective layer that is reflective in an unpolarized manner does not effect polarization separation of light. That is, the reflective layer may be any reflective layer as long as it is not a linearly-polarized-light-reflecting layer or a circularly-polarized-light-reflecting layer.

The reflective layer may be a transflective layer. That is, at the time of displaying an image, the reflective layer may function to transmit light exiting an image display device to display the image on the front surface of the vehicle mirror. Not at the time of displaying an image, the reflective layer may function to reflect at least part of incident light from the front surface direction so that the front surface of the vehicle mirror serves as a mirror.

The light reflectance of the reflective layer may be 60% to 90% and is preferably 80% to 90%, in terms of an average over the entire visible light region. The light reflectance of the reflective layer used as a transflective layer may be 30% to 60% and is preferably 40% to 50%. In this specification, the light reflectance means a value obtained by measuring a reflectance spectrum with a spectrophotometer and making a calculation according to a method for calculating visible light described in JIS A5759 and can be measured using a V-670 spectrophotometer available from JASCO Corporation, for example.

The reflective layer may be, for example, a reflective metal layer or a dielectric multilayer film.

Reflective Metal Layer

The material for forming the reflective metal layer is not particularly limited as long as it is a metal material that reflects visible light and may be, for example, aluminum, silver, or a silver alloy. To improve the durability of the reflective metal layer, the silver alloy may include another metal, for example, at least one metal selected from the group consisting of gold, palladium, copper, nickel, iron, gallium, indium, titanium, and bismuth to the extent that the reflectance properties of the reflective metal layer are not affected. From the viewpoint of moist-heat resistance, reflectance, and other properties, the silver alloy is particularly preferably an alloy of silver and at least one metal selected from the group consisting of gold, copper, nickel, iron, and palladium.

The reflective metal layer may have any thickness that can reliably provide sufficient reflection according to the material for forming the reflective metal layer. For example, the thickness is preferably 1 to 200 nm, more preferably 5 to 50 nm. When the reflective layer is a transflective layer, the thickness of the reflective metal layer may be adjusted to be smaller.

The reflective metal layer may be formed by any method, and either a wet method or a dry method may be used. Examples of the wet method include electroplating methods. Examples of the dry method include vacuum vapor deposition methods, sputtering methods, and ion plating methods. In particular, the reflective metal layer is preferably a vapor-deposited layer formed by a vacuum vapor deposition method.

As a substrate for forming the reflective metal layer, a glass plate, a polycarbonate plate, or an acrylic plate may be used. The thickness of the substrate may be about 100 μm to 10 mm and is preferably 500 μm to 5 mm, more preferably 800 μm to 3 mm.

Preferably, the substrate is included in the vehicle mirror without being processed. When the vehicle mirror includes the substrate 7, the high-Re retardation film 6, the substrate 7, and the reflective layer 5 may be in this order, or the high-Re retardation film, the reflective layer, and the substrate may be in this order.

A layer such as an undercoat polymer layer or an undercoat metal layer containing other metals such as copper, nickel, chromium, and iron may be disposed between the substrate and the reflective metal layer.

To prevent the reflective metal layer from being deteriorated, for example, by moisture, an inorganic barrier layer may be disposed on the surface of the reflective metal layer disposed on the substrate.

The material for the inorganic barrier layer is preferably, for example, an oxide, a nitride, a carbide, an acid nitride, or an acid carbide each including at least one metal selected from the group consisting of silicon (Si), aluminum (Al), indium (In), tin (Sn), zinc (Zn), titanium (Ti), copper (Cu), cerium (Ce), and tantalum (Ta). Of these, an oxide, a nitride, or an acid nitride of a metal selected from the group consisting of silicon, aluminum, indium, tin, zinc, and titanium is more preferred. An oxide, a nitride, or an acid nitride of a metal selected from the group consisting of silicon and aluminum is particularly preferred. The inorganic barrier layer may contain other elements as minor components.

The inorganic barrier layer may be formed by any method. For example, formation methods such as physical vapor deposition (PVD) methods such as vacuum vapor deposition methods, sputtering methods, and ion plating methods; chemical vapor deposition (CVD) methods such as plasma enhanced chemical vapor deposition (PECVD) methods; plating methods; liquid deposition methods such as sol-gel methods; and coating methods are suitable. Specifically, formation methods described in JP3400324B, JP2002-322561A, and JP2002-361774A can be used.

The inorganic barrier layer may have any thickness as long as permeation of moisture, etc. in the air can be inhibited. To achieve a film mirror having higher moist-heat resistance, the thickness is preferably 30 nm to 3 μm, and to achieve a film mirror having a higher reflectivity, higher moist-heat resistance, and higher flexibility, the thickness is more preferably 30 nm to 1 μm.

Dielectric Multilayer Film

As the dielectric multilayer film, a dielectric multilayer film that is reflective in an unpolarized manner is used.

The dielectric multilayer film can be formed, for example, by alternately laminating together one or more dielectric thin films having a high refractive index and one or more dielectric thin films having a low refractive index. The number of types of layers need not necessarily be two and may be more than two. The number of laminated layers is preferably 2 to 20, more preferably 2 to 12, still more preferably 4 to 10, particularly preferably 6 to 8.

The order of lamination of dielectric thin films is not particularly limited and can be appropriately selected according to the purpose. For example, when the refractive index of an adjacent film is high, a film having a refractive index lower than that of the adjacent film is laminated first. By contrast, when the refractive index of an adjacent layer is low, a film having a refractive index higher than that of the adjacent film is laminated first. The boundary between high and low refractive indices is 1.8. Whether the refractive index is high or low is not absolute. There may exist in materials having high refractive indices a material having a relatively high refractive index and a material having a relatively low refractive index, and these may be used alternately.

Examples of the material for the dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, and $ZrO_2$. Of these, $Bi_2O_3$, $CeO_2$, $CeF_3$, $HfO_2$, SiO, $Ta_2O_5$, $TiO_2$, $Y_2O_3$, ZnSe, ZnS, and $ZrO_2$ are preferred. Of these, SiO, $Ta_2O_5$, $TiO_2$, $Y_2O_3$, ZnSe, ZnS, and $ZrO_2$ are particularly preferred.

Examples of the material for the dielectric thin film having a low refractive index include $Al_2O_3$, $BiF_3$, $CaF_2$, $LaF_3$, $PbCl_2$, $PbF_2$, LiF, $MgF_2$, MgO, $NdF_3$, $SiO_2$, $Si_2O_3$, NaF, $ThO_2$, and $ThF_4$. Of these, $Al_2O_3$, $BiF_3$, $CaF_2$, $MgF_2$, MgO, $SiO_2$, and $Si_2O_3$ are preferred, and $Al_2O_3$, $CaF_2$, $MgF_2$, MgO, $SiO_2$, and $Si_2O_3$ are particularly preferred.

The atomic ratio in the materials for the dielectric thin films is not particularly limited and can be appropriately selected according to the purpose. The atomic ratio can be controlled by changing the gas concentration in an atmosphere during film formation.

The method of forming the dielectric thin films is not particularly limited and can be appropriately selected according to the purpose. Examples of the method include physical vapor deposition (PVD) methods such as ion plating, vacuum vapor deposition methods including ion beam deposition, and sputtering; and chemical vapor deposition (CVD) methods. Of these, vacuum vapor deposition methods and sputtering methods are preferred, and sputtering methods are particularly preferred.

A preferred sputtering method is a DC sputtering method which provides a high film-formation rate. In the DC sputtering method, it is preferable to use a material having high conductivity.

Examples of the method of forming a multilayer film by a sputtering method include (1) a single chamber method in which films are formed from different targets alternately or sequentially in a single chamber and (2) a multi-chamber method in which films are continuously formed in multiple chambers. Of these, the multi-chamber method is particularly preferred from the viewpoint of productivity and prevention of material contamination.

The thickness of the dielectric thin films is preferably $\lambda/16$ to $\lambda$, more preferably $\lambda/8$ to $3\lambda/4$, still more preferably $\lambda/6$ to $3\lambda/8$, on the order of optical wavelengths.

Image Display Device

The vehicle mirror 4 of the present invention may include an image display device 9 and have an image-displaying function. In this case, a transflective reflective layer is used as the reflective layer 5. In the vehicle mirror 4 of the present invention including an image display device 9, wherein the high-Re retardation film 6, the reflective layer 5, and the image display device 9 may be disposed in this order. An air layer or an adhesive layer may exist between the image display device 9 and the reflective layer 5.

In this specification, a surface on the reflective layer side relative to the image display device may be referred to as a front surface.

The image display device is preferably, but not necessarily, a liquid crystal display device or an organic EL device.

The liquid crystal display device may be of a transmissive type or a reflective type and is particularly preferably of a transmissive type. The liquid crystal display device may be any liquid crystal display device such as an in-plane switching (IPS) mode device, a fringe field switching (FFS) mode device, a vertical alignment (VA) mode device, an electrically controlled birefringence (ECB) mode device, a super twisted nematic (STN) mode device, a twisted nematic (TN) mode device, or an optically compensated bend (OCB) mode device. The image display device in the OFF state preferably shows an average reflectance of visible light at wavelengths of 380 to 780 nm of 30% or more, more preferably 40% or more. The reflection of visible light of the image display device in the OFF state may result from components (e.g., a reflective polarizing plate or a backlight unit) of the image display device.

An image displayed on an image display unit of the image display device may be a still image, a motion picture, or simple textual information. The image may be displayed as a mono-color display such as black and white, a multi-color display, or a full-color display. One preferred example of the image displayed on an image display unit of the image display device is an image picked up by an onboard camera. This image is preferably a motion picture.

The image display device, for example, may show a red light emission peak wavelength $\lambda R$, a green light emission peak wavelength $\lambda G$, and a blue light emission peak wavelength $\lambda B$ in an emission spectrum at the time of white display. Having such emission peak wavelengths enables a full-color image display. $\lambda R$ may be any wavelength in the range of 580 to 700 nm, preferably in the range of 610 to 680 nm. $\lambda G$ may be any wavelength in the range of 500 to 580 nm, preferably in the range of 510 to 550 nm. $\lambda B$ may be any wavelength in the range of 400 to 500 nm, preferably in the range of 440 to 480 nm.

The vehicle mirror including the image display device is produced such that the reflective layer side is disposed on the image display unit surface side of the image display device relative to the high-Re retardation film. When the vehicle mirror has a front panel, the image display device, the reflective layer, the high-Re retardation film, and the front panel are disposed in this order. After this, the image display device, the reflective layer, and the high-Re retardation film may be integrated as required.

The integration may be performed by means of adhesion or interconnection by an outer frame or a hinge.

Front Panel

The vehicle mirror of the present invention may have a front panel.

The front panel may be flat or curved.

The front panel may be in direct contact with the high-Re retardation film or may directly adhere to the high-Re retardation film through an adhesive layer or the like. Preferably, the front panel directly adheres to the high-Re retardation film through an adhesive layer or the like.

The front panel is not particularly limited. The front panel may be a glass plate or a plastic film used to produce a standard mirror. The front panel is preferably transparent in the visible light region. Being transparent in the visible light region means that light transmittance in the visible light region is 80% or more, preferably 85% or more. The light transmittance used as a measure of transparency is light transmittance calculated by a method described in JIS A5759. Specifically, transmittance at wavelengths of 380 nm to 780 nm is measured with a spectrophotometer and multiplied by a weighting coefficient obtained from the wavelength distribution and wavelength interval of CIE photopic spectral luminous efficiency and the spectral distribution of CIE daylight D65, and a weighted average is calculated to determine visible light transmittance.

The birefringence of the front panel is preferably small. For example, the front retardation may be 20 nm or less and is preferably less than 10 nm, more preferably 5 nm or less. Examples of the plastic film include polyesters such as polyethylene terephthalate (PET), polycarbonates, acrylic resins, epoxy resins, polyurethanes, polyamides, polyolefins, cellulose derivatives, and silicone.

A curved front panel can be produced by plastic processing such as injection molding. In injection molding, for example, raw plastic pellets are melted by heat, injected into a mold, and then solidified by cooling, whereby a resin product can be obtained.

The thickness of the front panel may be about 100 μm to 10 mm and is preferably 200 μm to 5 mm, more preferably 500 μm to 2 mm, still more preferably 500 μm to 1 mm.

The front panel may serve as the high-Re retardation film. In other words, the front panel may be the high-Re retardation film having a front retardation of 5,000 nm or more. Specifically, a plastic plate or the like having a front retardation of 5,000 nm or more may be the front panel, or a glass laminate including the high-Re retardation film 6 as an interlayer may be the front panel 8.

The glass laminate includes two glass plates 7 and an interlayer 6 therebetween. The glass laminate can be typically produced by sandwiching an interlayer sheet for a glass laminate between two glass plates 7, then repeating a heat treatment and a pressure treatment (e.g., a treatment using a rubber roller) for several times, and lastly performing a heat treatment under pressurized conditions using, for example, an autoclave. The thickness of the glass plates 7 may be, but not necessarily, about 0.5 mm to 5 mm and is preferably 1 mm to 3 mm, more preferably 2.0 to 2.3 mm.

The glass laminate including the high-Re retardation film as an interlayer may also be formed by forming the high-Re retardation film on a surface of a glass plate and then performing a typical process for producing a glass laminate. In this case, the high-Re retardation film, for example, may be bonded to the glass plate by an adhesive.

The glass laminate including the high-Re retardation film as an interlayer may also be formed by performing the heat treatment and the pressure treatment described above using, as an interlayer sheet, a laminated interlayer sheet for a glass laminate, the sheet including the high-Re retardation film. The laminated interlayer sheet for a glass laminate, the sheet including the high-Re retardation film, can be formed by bonding the high-Re retardation film to a surface of a known interlayer sheet. Alternatively, the laminated interlayer sheet can be formed by sandwiching the high-Re retardation film between two known interlayer sheets. The two interlayer sheets may be the same or different but are preferably the same.

The interlayer sheet may be, for example, a resin film including a resin selected from the group consisting of polyvinyl butyral (PVB), ethylene-vinyl acetate copolymers, and chlorine-containing resins. The resin is preferably a principal component of the interlayer sheet. The principal component refers to a component that accounts for 50% by mass or more of the interlayer sheet. Of the above resins, polyvinyl butyral or an ethylene-vinyl acetate copolymer is preferred, and polyvinyl butyral is more preferred. The resin is preferably a synthetic resin.

Polyvinyl butyral can be obtained by acetalizing a polyvinyl alcohol with butyraldehyde. The degree of acetalization of the polyvinyl butyral is preferably at least 40% and up to 85%, more preferably at least 60% and up to 75%.

The polyvinyl butyral can be prepared by acetalizing a polyvinyl alcohol with butyraldehyde. A polyvinyl alcohol is typically obtained by saponifying polyvinyl acetate, and a polyvinyl alcohol having a degree of saponification of 80 to 99.8 mol % is typically used.

The degree of polymerization of the polyvinyl alcohol is preferably at least 200 and up to 3,000. When the degree of polymerization is less than 200, a glass laminate having low penetration resistance may be provided. When the degree of polymerization is more than 3,000, the resin film may have poor moldability, and, in addition, the resin film may have excessively high stiffness, leading to poor workability. The degree of polymerization is more preferably at least 500 and up to 2,000.

For the bonding of the high-Re retardation film to the interlayer sheet, a known bonding method can be used, but it is preferable to use a lamination treatment. When the lamination treatment is performed, it is preferably performed under somewhat heated and pressurized conditions to prevent the high-Re retardation film and the interlayer sheet from peeling off from each other after processing.

To stably perform the lamination, the surface temperature of the interlayer sheet on the side to which the high-Re retardation film is to be bonded is preferably 50° C. to 130° C., more preferably 70° C. to 100° C.

Preferably, a pressure is applied during the lamination. The pressure is preferably less than 2.0 kg/cm$^2$ (0.196 MPa), more preferably in the range of 0.5 to 1.8 kg/cm$^2$ (0.049 to 0.176 MPa), still more preferably in the range of 0.5 to 1.5 kg/cm$^2$ (0.049 to 0.147 MPa).

The vehicle mirror having a glass laminate structure may be produced by using one of the glass plates of the glass laminate as a substrate and disposing the reflective layer on the substrate such that the reflective layer is on the interlayer side. Furthermore, the vehicle mirror having a glass laminate structure may be produced by disposing the reflective layer and/or the high-Re retardation film on a glass plate by any of the following procedures. Specifically, for example, the high-Re retardation film and the reflective layer are laminated in this order to the interlayer side of an observer-side glass plate; the high-Re retardation film is disposed on the interlayer side of the observer-side glass plate, and the reflective layer is disposed on the interlayer side of the opposite glass plate; the reflective layer and the high-Re retardation film are laminated in this order to the interlayer side of a glass plate opposite to the observer side; or the reflective layer is disposed on the interlayer side of a glass plate opposite to the observer side, and the high-Re retardation film is disposed on the interlayer.

Adhesive Layer

The vehicle mirror of the present invention may include adhesive layers for adhesion of the reflective layer and the high-Re retardation film, the image display device and the reflective layer, and other layers. The adhesive layers may be any layers formed from adhesives.

According to the type of setting, adhesives are classified into hot melt adhesives, thermosetting adhesives, photosetting adhesives, reaction-setting adhesives, and pressure-sensitive adhesives requiring no setting. As materials for these adhesives, compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds can be used. From the viewpoint of workability and productivity, the type of setting is preferably photosetting, and from the viewpoint of optical transparency and heat resistance, the material for use is preferably, for example, an acrylate compound, a urethane acrylate compound, or an epoxy acrylate compound.

EXAMPLES

The present invention will now be described in more detail with reference to examples. Materials, reagents, amounts and percentages of substances, operations, etc. used in the following examples can be changed as appropriate without departing from the spirit of the present invention. Therefore, it should be noted that the following examples are not intended to limit the scope of the present invention.

Production of Reflective Layer

On a glass plate having a thickness of 1.8 mm, Al (metal aluminum) was uniformly vapor-deposited by a vacuum vapor deposition method to form a reflective layer. Silicon oxide (SiO) as an inorganic barrier layer was then vapor-deposited thereon to obtain a reflective metal layer mirror having a visible light reflectance of 90%.

A dielectric multilayer film half mirror (Cat. No. H266: thickness, 2 mm; reflectance, 70%) available from Shibuya Optical Co., Ltd. was used as a dielectric multilayer film mirror.

Production of Retardation Film (High-Re Retardation Film)

Synthesis of Starting Polyester

Starting Polyester 1

As described below, terephthalic acid and ethylene glycol were directly reacted together to distill off water and esterified, after which a starting polyester 1 (Sb-catalyzed PET) was obtained with a continuous polymerization apparatus by using a direct esterification method in which polycondensation is performed under reduced pressure.

(1) Esterification Reaction

High-purity terephthalic acid in an amount of 4.7 tons and ethylene glycol in an amount of 1.8 tons were mixed over 90 minutes to form a slurry, and the slurry was continuously fed to a first esterification reaction vessel at a flow rate of 3,800 kg/h. A solution of antimony trioxide in ethylene glycol was further continuously fed thereto, and a reaction was performed with stirring under the following conditions: temperature in reaction vessel, 250° C.; mean residence time, about 4.3 hours. During the reaction, the antimony trioxide was continuously added such that the amount of Sb added was 150 ppm on an elemental basis.

The reaction product was transferred to a second esterification reaction vessel and allowed to react with stirring under the following conditions: temperature in reaction vessel, 250° C.; mean residence time, about 1.2 hours. To the second esterification reaction vessel, a solution of magnesium acetate in ethylene glycol and a solution of trimethyl phosphate in ethylene glycol were continuously fed such that the amount of Mg added and the amount of P added were 65 ppm and 35 ppm, respectively, on an elemental basis.

(2) Polycondensation Reaction

The esterification reaction product obtained above was continuously fed to a first polycondensation reaction vessel and allowed to undergo polycondensation reaction with stirring under the following conditions: reaction temperature, 270° C.; pressure in reaction vessel, 20 torr ($2.67 \times 10^{-3}$ MPa); mean residence time, about 1.8 hours.

The reaction product was further transferred to a second polycondensation reaction vessel and allowed to undergo reaction (polycondensation) in this reaction vessel with stirring under the following conditions: temperature in reaction vessel, 276° C.; pressure in reaction vessel, 5 torr ($6.67 \times 10^{-4}$ MPa); mean residence time, about 1.2 hours.

The reaction product was then further transferred to a third polycondensation reaction vessel and allowed to undergo reaction (polycondensation) in this reaction vessel under the following conditions: temperature in reaction vessel, 278° C.; pressure in reaction vessel, 1.5 torr ($2.0 \times 10^{-4}$ MPa); mean residence time, 1.5 hours, thereby obtaining a reaction product (polyethylene terephthalate (PET)).

The reaction product obtained was then discharged in strand form into cold water and immediately cut to produce polyester pellets (section: major axis, about 4 mm; minor axis, about 2 mm; length: about 3 mm).

The polymer obtained had an intrinsic viscosity (IV) of 0.63. This polymer is a starting polyester 1 (hereinafter abbreviated as PET 1).

Starting Polyester 2

A dried ultraviolet absorber (2,2'-(1,4-phenylene)bis(4H-3,1-benzoxazin-4-one) in an amount of 10 parts by mass and PET 1 (IV=0.63) in an amount of 90 parts by mass were mixed, and using a kneading extruder, the resultant was pelletized in the same manner as in the production of PET 1 to obtain a starting polyester 2 (hereinafter abbreviated as PET 2) containing the ultraviolet absorber.

Production of Polyester Film

Film-Forming Step

PET 1 in an amount of 90 parts by mass and 10 parts by mass of PET 2 containing the ultraviolet absorber were dried to a moisture content of 20 ppm or lower, then placed into a hopper 1 of a single-screw kneading extruder 1 having a diameter of 50 mm, and melted in the extruder 1 at 300° C. (interlayer II).

PET 1 was dried to a moisture content of 20 ppm or lower, then placed into a hopper 2 of a single-screw kneading extruder 2 having a diameter of 30 mm, and melted in the extruder 2 at 300° C. (external layer I, external layer III).

These two polymer melts were separately passed through gear pumps and filters (pore size, 20 μm), then laminated at a two-type three-layer manifold block such that the polymer extruded from the extruder 1 formed an interlayer (layer II) and the polymer extruded from the extruder 2 formed external layers (layer I and layer III), and extruded in sheet form through a die having a width of 120 mm.

The molten resin was extruded through the die under the following conditions: pressure fluctuation, 1%; molten resin temperature distribution, 2%. Specifically, the back pressure was higher than the mean pressure inside barrels of the extruders by 1%, and the pipe temperature of the extruders was higher than the mean temperature inside the barrels of the extruders by 2%.

The molten resin extruded through the die was cast onto a cooling casting drum set to a temperature of 25° C. and brought into close contact with the cooling casting drum by electrostatic application. The molten resin was stripped off using strip-off rolls oppositely disposed on the cooling casting drum to obtain an unstretched polyester film. In this process, the amount of discharge from the extruders was controlled so that the thickness ratio of layer I to layer II to layer III was 10:80:10. Furthermore, the molten resin was extruded through the die under varied conditions to obtain unstretched polyester films having different thicknesses.

Preparation of Coating Liquid H

A coating liquid H was prepared using a composition described below.

| Coating Liquid H | |
|---|---|
| Water | 56.6 parts by mass |
| Acrylic resin (A1, solid content: 28% by mass) | 21.4 parts by mass |
| Carbodiimide compound (B1, solid content: 40% by mass) | 2.9 parts by mass |
| Surfactant (E1, an aqueous solution with a solid content of 1% by mass) | 8.1 parts by mass |
| Surfactant (E2, an aqueous solution with a solid content of 1% by mass) | 9.6 parts by mass |

-continued

| Coating Liquid H | |
|---|---|
| Particles (F1, solid content: 40% by mass) | 0.4 part by mass |
| Lubricant (G, solid content: 30% by mass) | 1.0 part by mass |

The compounds used are detailed below.
Acrylic resin: (A1)
As an acrylic resin (A1), an aqueous dispersion (solid content: 28% by mass) of an acrylic resin obtained by polymerization of a monomer of the following composition was used.
Emulsion polymer (emulsifier: anionic surfactant) of methyl methacrylate/styrene/2-ethylhexyl acrylate/2-hydroxyethyl methacrylate/acrylic acid=59/9/26/5/1 (% by mass), Tg=45° C.
  Carbodiimide compound: (B1) (Carbodilite V-02-L2 available from Nisshinbo Inc.)
  Surfactant: (E1) sulfosuccinate surfactant (Rapisol A-90 available from NOF Corporation)
  Surfactant: (E2) polyethylene oxide surfactant (Naroacty CL-95 available from Sanyo Chemical Industries, Ltd.)
  Particles: (F1) silica sol having an average particle size of 50 nm
  Lubricant: (G) carnauba wax
Formation of Retardation Films
Formation of Uniaxially Stretched (Transversely Stretched) Films (Retardation Films A to D)
The coating liquid H of the above composition was applied to both surfaces of the unstretched polyester film by reverse roll coating while controlling the amount of application such that the amount of dried coating would be 0.12 g/m². The resulting film was guided to a tenter (transverse stretching machine). With ends of the film held by clips, the film was heated to a temperature that allowed the film to be stretched when a preheating temperature was 92° C., thereby stretching the film 4.0-fold in the width direction (stretching rate: 900%/min) to obtain a film having a width of 5 m. Next, the polyester film was heat-set and relaxed with its surface temperature controlled to be 160° C. and then cooled at a cooling temperature of 50° C.
After the cooling, the polyester film was longitudinally divided into three parts each having a width of 1.4 m, and chucked portions were trimmed. After this, each divided roll was pressed (knurled) at both its ends over a width of 10 mm and then wound up by 2,000 m under a tension of 18 kg/m. The divided samples were named a side edge A, a center B, and a side edge C from one side edge, and the center B was used.
Formation of Biaxially Stretched (Longitudinally and Transversely Stretched) Film (Retardation Film E)
The unstretched polyester film was heated to 90° C. using heated rolls and an infrared heater and then stretched 3.1-fold in the film travel direction using rolls having different rotation speeds. After this, the coating liquid H was applied to both surfaces of the stretched film by reverse roll coating while controlling the amount of application such that the amount of dried coating would be 0.12 g/m² on the both surfaces. The film having the coating formed thereon was guided to a tenter. With ends of the film held by clips, the film was heated to a temperature that allowed the film to be stretched when a preheating temperature was 125° C., thereby stretching the film 4.0-fold in the width direction. Next, heat-setting was performed so that the surface temperature would be 230° C. Except for this, the same procedure as that for the uniaxially stretched films was performed to produce a retardation film E.
The thickness and Re of the retardation films A to D are shown in Table 1.

TABLE 1

| | Stretching ratio | | | |
|---|---|---|---|---|
| | Longitudinal stretching | Transverse stretching | Thickness [μm] | Re [nm] |
| Retardation film A | 1.0 | 4.0 | 50 | 5170 |
| Retardation film B | 1.0 | 4.0 | 80 | 8060 |
| Retardation film C | 1.0 | 4.0 | 160 | 16120 |
| Retardation film D | 3.1 | 4.0 | 100 | 1530 |

Re shown in Table 1 was measured as described below. Orientation axis directions of the film were determined using two polarizing plates, and a rectangle of 4 cm×2 cm was cut out such that the orientation axis directions were orthogonal to each other to prepare a test sample. For this sample, refractive indices (Nx, Ny) of the two orthogonal axes and a refractive index (Nz) in the thickness direction were measured with an Abbe refractometer (NAR-4T available from Atago Co., Ltd., measurement wavelength: 589 nm), and the absolute value of a refractive index difference of the two axes (|Nx−Ny|) was defined as a refractive index anisotropy (ΔNxy). The thickness d (nm) of the film was measured using an electric micrometer (Millitron 1245D available from Feinpruf GmbH) and expressed in units of nm. A front retardation (Re) was calculated from the product (ΔNxy×d) of the refractive index anisotropy (ΔNxy) and the thickness d (nm) of the film.

Example 1

Using an adhesive sheet (PDS-1) available from Panac Corporation, the retardation film A was bonded to the glass plate surface opposite to the vapor-deposited surface of the reflective metal layer mirror to produce a vehicle mirror of Example 1.

Example 2

A vehicle mirror of Example 2 was produced in the same manner as in Example 1 except that the retardation film B was used instead of the retardation film A.

Example 3

A vehicle mirror of Example 3 was produced in the same manner as in Example 1 except that the retardation film C was used instead of the retardation film A.

Example 4

A vehicle mirror of Example 4 was produced in the same manner as in Example 1 except that the dielectric multilayer film mirror was used instead of the reflective metal layer mirror.

Comparative Example 1

No retardation films were used, and the reflective metal layer mirror alone was used as a vehicle mirror of Comparative Example 1.

Comparative Example 2

A vehicle mirror of Comparative Example 2 was produced in the same manner as in Example 1 except that the retardation film D was used instead of the retardation film A.

Comparative Example 3

No retardation films were used, and the dielectric multi-layer film mirror alone was used as a vehicle mirror of Comparative Example 3.

Comparative Example 4

A vehicle mirror of Comparative Example 4 was produced in the same manner as in Example 4 except that the retardation film D was used instead of the retardation film A.

Evaluation Method

The mirrors produced above were each attached to an internal mirror position of a vehicle (model: Honda Step WGN 2002 (registered trademark)) with a surface to which the retardation film was bonded facing a driver side. Mirror-reflected images observed when a driver wore polarizing sunglasses and sunlight was incident on the internal mirror position through a rear window pane of the vehicle were evaluated according to the following criteria. The results are shown in Table 2.

Unevenness (Due to Rear Window Pane Birefringence)
A: No oblique brightness unevenness of light is observed.
B: Oblique brightness unevenness of light is observed.
Unevenness (Due to Retardation Film)
A: No spotty color unevenness or oblique color unevenness is observed.
B: Spotty color unevenness or oblique color unevenness is observed.

As can be seen from the results shown in Table 2, unevenness due to rear window pane birefringence was not observed in Examples 1 to 4. Unevenness due to retardation film was also not observed.

TABLE 2

| | | Retardation layer | | Evaluation | |
| --- | --- | --- | --- | --- | --- |
| | Reflective layer | Type | Re | Unevenness (due to rear window pane birefringence) | Unevenness (due to retardation film) |
| Example 1 | reflective metal layer | retardation film A | 5170 | A | A |
| Example 2 | reflective metal layer | retardation film B | 8060 | A | A |
| Example 3 | reflective metal layer | retardation film C | 16120 | A | A |
| Example 4 | dielectric multilayer film | retardation film A | 5170 | A | A |
| Comparative Example 1 | reflective metal layer | not used | — | B | — |
| Comparative Example 2 | reflective metal layer | retardation film D | 1530 | A | B |
| Comparative Example 3 | dielectric multilayer film | not used | — | B | — |
| Comparative Example 4 | dielectric multilayer film | retardation film D | 1530 | A | B |

| List of Reference Numbers | |
| --- | --- |
| 1 | Vehicle |
| 2 | Rear-view mirror |
| 3 | Rear window pane |
| 4 | Vehicle mirror |
| 5 | Reflective layer |
| 6 | High Re retardation film (interlayer) |
| 7 | Glass plate (substrate) |
| 8 | Front panel |
| 9 | Image display device |

What is claimed is:

1. A rear-view mirror of a vehicle comprising:
   a high-Re retardation film; and
   a reflective layer, the high-Re retardation film and the reflective layer being disposed in this order from a viewer side,
   wherein the rear-view mirror is an internal mirror,
   the high-Re retardation film has a front retardation of 5,000 nm or more,
   the reflective layer is reflective in an unpolarized manner, and
   the light reflectance of the reflective layer is at least 60% in terms of an average over an entire visible light region.

2. The rear-view mirror of the vehicle according to claim 1, wherein the reflective layer is a reflective metal layer or a dielectric multilayer film.

3. The rear-view mirror of the vehicle according to claim 2, wherein the reflective metal layer includes aluminum or silver.

4. The rear-view mirror of the vehicle according to claim 3, wherein the reflective metal layer is a vapor-deposited layer.

5. The rear-view mirror of the vehicle according to claim 4, wherein the reflective metal layer includes aluminum, and the high-Re retardation film includes polyethylene terephthalate.

6. The rear-view mirror of the vehicle according to claim 2, wherein the reflective metal layer includes aluminum.

7. The rear-view mirror of the vehicle according to claim 6, wherein the reflective metal layer is a vapor-deposited layer.

8. The rear-view mirror of the vehicle according to claim 7, wherein the reflective metal layer includes aluminum, and the high-Re retardation film includes polyethylene terephthalate.

9. The rear-view mirror of the vehicle according to claim 6, wherein the reflective metal layer includes aluminum, and the high-Re retardation film includes polyethylene terephthalate.

10. The rear-view mirror of the vehicle according to claim 2, wherein the reflective metal layer is a vapor-deposited layer.

11. The rear-view mirror of the vehicle according to claim 10, wherein the reflective metal layer includes aluminum, and the high-Re retardation film includes polyethylene terephthalate.

12. The rear-view mirror of the vehicle according to claim 2, wherein the reflective metal layer includes aluminum, and the high-Re retardation film includes polyethylene terephthalate.

13. The rear-view mirror of the vehicle according to claim 3, wherein the reflective metal layer includes aluminum, and the high-Re retardation film includes polyethylene terephthalate.

14. The rear-view mirror of the vehicle according to claim 1, wherein the front retardation is 7,000 nm or more.

15. The rear-view mirror of the vehicle according to claim 14, wherein the reflective metal layer includes aluminum, and the high-Re retardation film includes polyethylene terephthalate.

16. The rear-view mirror of the vehicle according to claim 1, wherein the high-Re retardation film is a polyester film.

17. The rear-view mirror of the vehicle according to claim 1, wherein the high-Re retardation film includes polyethylene terephthalate.

18. The rear-view mirror of the vehicle according to claim 1, wherein the reflective metal layer includes aluminum, and the high-Re retardation film includes polyethylene terephthalate.

19. The rear-view mirror of the vehicle according to claim 1, comprising a front panel,
    wherein the front panel is a glass laminate including two glass plates and an interlayer between the two glass plates, and
    the interlayer includes the high-Re retardation film.

20. The rear-view mirror of the vehicle according to claim 1, further comprising an image display device,
    wherein the high-Re retardation film, the reflective layer, and the image display device are disposed in this order, and the reflective layer is transflective.

21. A vehicle comprising the rear-view mirror of the vehicle according to claim 1 and a rear window pane including tempered glass.

* * * * *